United States Patent [19]
Shoge

[11] Patent Number: 5,961,416
[45] Date of Patent: *Oct. 5, 1999

[54] INTERNALLY MOUNTED BICYCLE TRANSMISSION

[75] Inventor: Akihiko Shoge, Shimonoseki, Japan

[73] Assignee: Shimano, Inc., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/806,901

[22] Filed: Feb. 26, 1997

[30] Foreign Application Priority Data

Mar. 15, 1996 [JP] Japan .................................. 8-058785

[51] Int. Cl.$^6$ ........................................................ F16H 3/44
[52] U.S. Cl. ........................................... 475/297; 192/217
[58] Field of Search .................................... 475/294, 296, 475/297, 298; 192/6 A

[56] References Cited

U.S. PATENT DOCUMENTS

| | | | |
|---|---|---|---|
| 931,656 | 8/1909 | Sangster | 475/300 X |
| 1,045,236 | 11/1912 | Winkler | 475/288 |
| 1,249,659 | 12/1917 | Olsen | 475/294 X |
| 3,147,641 | 9/1964 | Schwerdhofer | 475/294 |
| 3,215,002 | 11/1965 | Schwerdhofer | 475/294 |
| 4,276,973 | 7/1981 | Fukui | 475/269 X |
| 4,400,999 | 8/1983 | Steuer | 475/297 X |
| 4,973,297 | 11/1990 | Bergles | 475/298 X |
| 5,078,664 | 1/1992 | Nagano | 475/297 |
| 5,322,487 | 6/1994 | Nagano | 475/297 |
| 5,562,563 | 10/1996 | Shoge | 475/298 |

FOREIGN PATENT DOCUMENTS

| | | |
|---|---|---|
| 0 693 419 A2 | 1/1996 | European Pat. Off. . |
| 0 693 419 A3 | 3/1996 | European Pat. Off. . |
| 5-65094 | 3/1993 | Japan . |
| 25799 | 12/1905 | United Kingdom .................. 192/6 A |

Primary Examiner—Charles A. Marmor
Assistant Examiner—Scott Lund
Attorney, Agent, or Firm—James A. Deland

[57] ABSTRACT

An internally mounted bicycle transmission includes a hub axle, a drive member rotatably mounted around the hub axle, a hub body rotatably mounted around the hub axle, and a gear mechanism coupled between the drive member and the hub body for communicating rotational force from the drive member to the hub body through multiple transmission paths. The gear mechanism includes a sun gear rotatably supported around the axle, a planet gear supported by a planet gear carrier for rotation around the hub axle and for engaging the sun gear, and a ring gear engaging the planet gear. According to the invention, the ring gear is integrally formed with the drive member.

18 Claims, 6 Drawing Sheets

FIG. 10

| Shift position (operating position of operating tube 45) | Clutch control | | | | | | |
|---|---|---|---|---|---|---|---|
| | 35 | 36 | 37 | 41 | 42 | 43 | 44 |
| Seventh speed | O | O | – | – | – | O | – |
| Sixth speed | O | O | – | – | – | X | O |
| Fifth speed | X | O | – | – | O | O | – |
| Fourth speed | X | O | – | O | X | O | – |
| Third speed | X | O | – | O | X | X | O |
| Second speed | X | – | O | – | O | X | X |
| First speed | X | – | O | O | X | X | X |

INTERNALLY MOUNTED BICYCLE TRANSMISSION

BACKGROUND OF THE INVENTION

The present invention is directed to bicycle transmissions and, more particularly, to bicycle transmissions internally mounted within a wheel hub.

JP 5-65094 discloses an internally mounted bicycle transmission that includes a hub axle, a drive member rotatably mounted around the hub axle, a hub body rotatably mounted around the hub axle, and a gear mechanism coupled between the drive member and the hub body for communicating rotational force from the drive member to the hub body through multiple transmission paths. The gear mechanism includes a sun gear rotatably supported around the hub axle, a planet gear supported by a planet gear carrier for rotation around the hub axle, and a ring gear engaging the planet gear. A first one-way clutch is coupled between the drive member and the ring gear, and a second one-way clutch is coupled between the drive member and the planet gear carrier. Various transmission paths may be selected by selectively engaging and disengaging the first or second one-way clutches, thus resulting in multiple speed stages having relatively narrow steps between adjacent speed stages.

With an internally mounted transmission as described above, the ring gear and the driver must be molded and assembled separately, which drives up the cost and makes the structure more complicated. Furthermore, it is necessary to use a clutch mechanism that links the ring gear and the driver, thus further increasing the cost and making the structure more complicated. When there are more parts involved, there also is the risk that there would be looseness caused by manufacturing error or the like between the driver and the ring gear.

SUMMARY OF THE INVENTION

The present invention is directed to an internally mounted bicycle transmission that has a large number of speed steps, provides excellent power transmission, is inexpensive, and has a simpler structure than prior art transmissions. In one embodiment of the present invention, an internally mounted bicycle transmission includes a hub axle, a drive member rotatably mounted around the hub axle, a hub body rotatably mounted around the hub axle, and a gear mechanism coupled between the drive member and the hub body for communicating rotational force from the drive member to the hub body through multiple transmission paths. The gear mechanism includes a sun gear rotatably supported around the axle, a planet gear supported by a planet gear carrier for rotation around the hub axle and for engaging the sun gear, and a ring gear engaging the planet gear. According to the invention, the ring gear is integrally formed with the drive member.

In a more specific embodiment, the drive member comprises an annular member having a first end structured for attaching a sprocket thereto and a second end having a plurality of teeth disposed along an inner peripheral surface thereof for forming the ring gear. If desired, the ring gear may be formed as one piece with the drive member. To facilitate assembly, the ring gear may define a first hole having a first diameter (D1), the second end of the annular member may define a second hole having a second diameter (D2), and the first end of the annular member may define a third hole having a third diameter (D3) for receiving a hub axle therethrough, wherein D1>D2>D3. A power transmission clutch may be disposed between the drive member and the planet gear carrier, wherein the power transmission clutch is disposed within the second hole. An outer peripheral surface of the first end of the annular member defines the sprocket attachment component and is structured for nonrotatably attaching the sprocket thereto, and the hub body is rotatably supported on the second end of the drive member.

BRIEF DESCRIPTION OF THE DRAWINGS

FIG. 6(*b*) is a cross sectional view of a particular embodiment of a third sun clutch according to the present invention;

FIG. 10 is diagram showing the state of the various transmission components for the various speed stages.

DETAILED DESCRIPTION OF THE EMBODIMENTS

Figure 1:
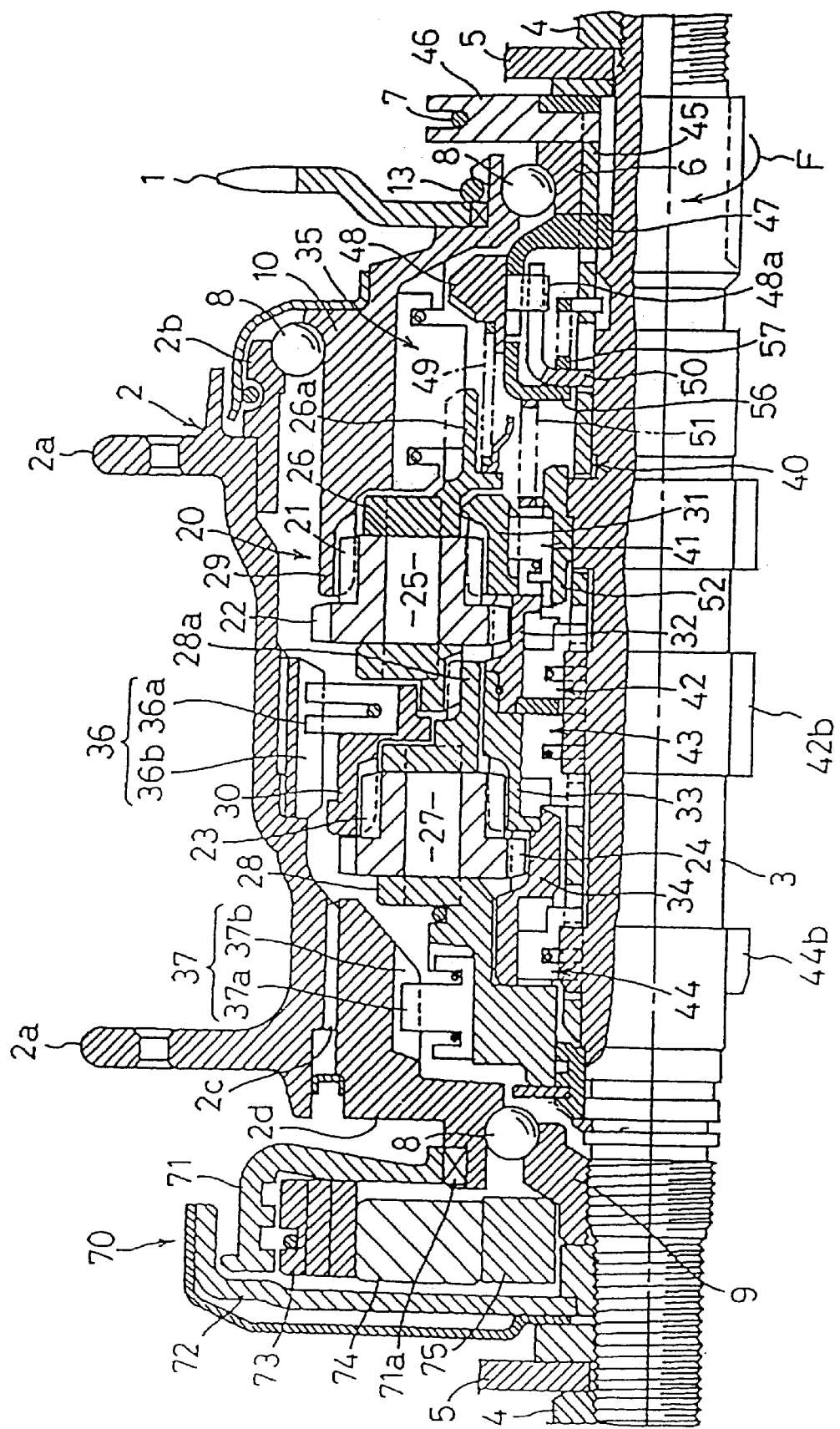
FIG. 1 is a partial cross sectional view of a particular embodiment of an internally mounted bicycle transmission according to the present invention.

FIG. 1 is a partial cross sectional view of a particular embodiment of an internally mounted bicycle transmission according to the present invention. As shown in FIG. 1, a driver 10, on one end of which a chain sprocket 1 is rotatably and integrally provided, and a hub body 2, which is equipped on its outer peripheral sides with a left and right pair of hub flanges 2*a*, are rotatably attached to a hub axle 3. The hub body 2 is equipped on its inner side with a shifter 20 that transmits the rotational power of the driver 10 to the hub body 2 by shifting between seven stages (first speed to seventh speed) by means of four planet gears 21 through 24. The shifting operation of the shifter 20 is performed by means of an operating mechanism 40 that has an operating tube 45 or the like fitted around the hub axle 3 such that it can be rotationally operated. The lateral side of the hub body 2 opposite the side where the driver 10 is located is equipped with a brake 70 that has a brake drum 71 or the like linked to the end of the hub body 2. Thus, the above components constitute an internal hub for a bicycle shifter with a built-in brake.

With this internally mounted hub transmission, the fork of a bicycle wheel (not shown) is linked to the hub flanges 2*a*, and the hub axle 3 is fixed to a bicycle frame 5 such that it will not rotate by means of attachment nuts 4 provided on either side of the hub axle 3. The chain sprocket 1 is hooked up to the front gear (not shown) of the bicycle by a drive chain (not shown), and the wheel is driven forward by driving the driver 10 in the rotational direction F by means of this front gear. A brake cable (not shown) from a brake lever (not shown) is linked to the operating component of the brake 70, and the brake lever is used to operate the brake 70 and apply a braking force to the wheel. A shift cable 7 from the shift lever unit (not shown) of the bicycle is linked to a cable holder 46 which sticks out from the cone 6 of the operating tube 45. The end of the operating tube 45 is able to rotate integrally with the cable holder 46, so the shift lever unit is used to rotationally operate the operating tube 45 and shift the bicycle drive speed between seven stages. This structure will be described in detail below.

The driver 10 is fitted around the hub axle 3 and is in the form of a cylinder fitted on the inside at one end of the hub body 2. Driver 10 is rotatably attached at one end to the hub axle 3 via balls 8 and a cone 6. An attachment component 2b that is made in the form of a ring that fits around the driver 10 and that has a ball race is integrally rotatably provided to one end of the hub body 2. This attachment component 2b is rotatably attached to the driver 10 via balls 8. A side wall component 2d that is integrally rotatably engaged by a spline component 2c is provided to the other end of the hub body 2. This side wall component 2d is rotatably attached to the hub axle 3 via the balls 8 and a cone 9. As a result, the hub body 2 is rotatably supported on the hub axle 3, and relative rotation is possible between the hub axle 3 and the driver 10.

Of the four planet gears 21 through 24, the first planet gear 21 and the second planet gear 22, whose outside diameter is larger than that of the first planet gear 21, are formed as an integral gear such that they rotate integrally, and they are rotatably supported on a first carrier 26 via a rotating support shaft 25. Of the four planet gears 21 through 24, the third planet gear 23 and the fourth planet gear 24, whose outside diameter is larger than that of the third planet gear 23, are formed as an integral gear such that they rotate integrally, and they are rotatably supported on a second carrier 28 via a rotating support shaft 27. The inner peripheral side of a first ring gear 29, which is structured such that it fits around the outside on one end of the first carrier 26 so as to allow relative rotation, is meshed with the first planet gear 21, and the inner peripheral side of a second ring gear 30, which is structured such that it fits around the outside on one end of the second carrier 28 so as to allow relative rotation, is meshed with the third planet gear 23. The first ring gear 29 is formed as an integral part with the driver 10 by simultaneous molding at one end of the driver 10 during the molding thereof. As a result, the rotational power of the driver 10 is transmitted from the first ring gear 29 to the first planet gear 21 and the second planet gear 22. A spline component 28a provided to one end of the second carrier 28 is engaged with the end of the first carrier 26 such that relative rotation is impossible. As a result, the first carrier 26 and the second carrier 28 rotate integrally with respect to the hub axle 3.

Of the four ring-shaped sun gears 31 through 34, which are structured such that they fit around the outside of the hub axle 3 so as to allow relative rotation, the outer peripheral side of the first sun gear 31 is meshed with the first planet gear 21, the outer peripheral side of the second sun gear 32 is meshed with the second planet gear 22, the outer peripheral side of the third sun gear 33 is meshed with the third planet gear 23, and outer peripheral side of the fourth sun gear 34 is meshed with the fourth planet gear 24. A first power transmission clutch 35 is provided between the driver 10 and that carrier end component 26a of the first carrier 26 that is on the inside of the driver 10, a second power transmission clutch 36 is provided between the hub body 2 and the outer peripheral side of the second ring gear 30, and a third power transmission clutch 37 is provided between the side wall component 2d of the hub body 2 and that end of the second carrier 28 that is on the opposite side from the side supporting the planet gear.

Figure 2:
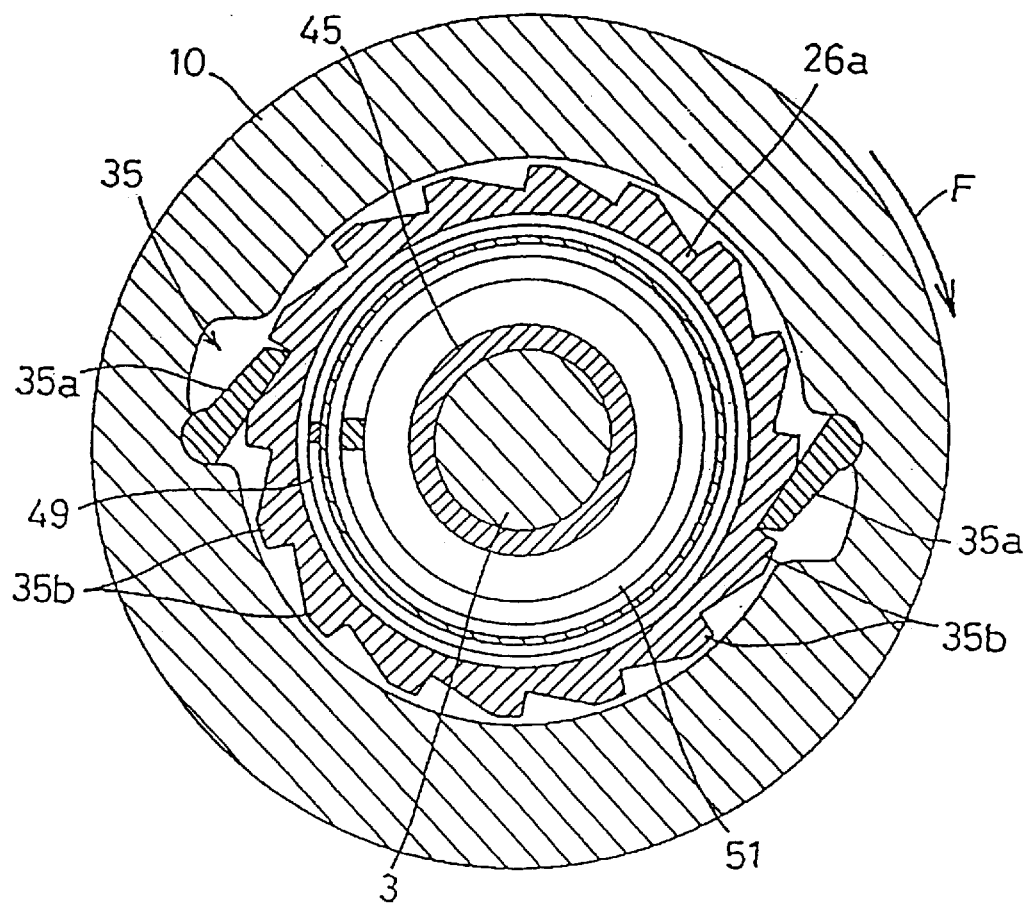
FIG. 2 is a cross sectional view of a particular embodiment of a first transmission clutch according to the present invention.

The first power transmission clutch 35 is structured as shown in FIG. 2. More specifically, first power transmission clutch 35 is made up of ratchet pawls 35a that are attached such that they can swing up or down at two places in the peripheral direction on the inner peripheral side of the driver 10, and ratchet teeth 35b that are formed on the outer peripheral surface of the carrier end component 26a such that they can engage with and disengage from the tips of the ratchet pawls 35a. The ratchet pawls 35a are equipped with pawl springs, and these pawl springs energize the ratchet pawls 35a so that they stand up, thus biasing the tips of the ratchet pawls 35a so that they engage with the ratchet teeth 35b. In other words, the first power transmission clutch 35 is a one-way clutch, meaning that when the driver 10 rotates in the rotational direction F, the rotational power thereof is transmitted to the first carrier 26, but if the first carrier 26 rotates in the rotational direction F, the rotational power thereof is not transmitted to the driver 10. Therefore, the rotational power of the driver 10 in the rotational direction F can be transmitted to the first carrier 26.

The second power transmission clutch 36 is made up of a ratchet pawl 36a that is attached such that it can swing up or down on the outer peripheral side of the second ring gear 30, and ratchet teeth 36b that are provided on the inner peripheral side of the hub body 2 such that they can engage with and disengage from the tip of this ratchet pawl 36a. The ratchet pawl 36a is equipped with a pawl spring, and this pawl spring energizes the ratchet pawl 36a so that it stands up, thus biasing the tip of the ratchet pawl 36a so that it engages with the ratchet teeth 36b. In other words, the second power transmission clutch 36 is a one-way clutch, meaning that when the second ring gear 30 rotates in the rotational direction F, the rotational power thereof is transmitted to the hub body 2, and the hub body 2 is permitted to rotate at a higher speed in the rotational direction F than the second ring gear 30.

The third power transmission clutch 37 is made up of a ratchet pawl 37a that is attached such that it can swing up or down on the outer peripheral side of the second carrier 28, and ratchet teeth 37b that are provided on the inner peripheral side of the side wall component 2d such that they can engage with and disengage from the tip of this ratchet pawl 37a. The ratchet pawl 37a is equipped with a pawl spring, and this pawl spring energizes the ratchet pawl 37a so that it stands up, thus biasing the tip of the ratchet pawl 37a so that it engages with the ratchet teeth 37b. In other words, the third power transmission clutch 37 is a one-way clutch, meaning that when the second carrier 28 rotates in the rotational direction F, the rotational power thereof is transmitted to the hub body 2, and the hub body 2 is permitted to rotate at a higher speed in the rotational direction F than the second carrier 28.

The operating mechanism 40 includes a first sun clutch 41 provided between the first sun gear 31 and the hub axle 3, a second sun clutch 42 provided between the second sun gear 32 and the hub axle 3, a third sun clutch 43 provided between the third sun gear 33 and the hub axle 3, and a fourth sun clutch 44 provided between the fourth sun gear 34 and the hub axle 3. Sun clutches 41 through 44 are structured as one-way clutches which allow the sun gears 31, 32, 33, and 34 to rotate in the rotational direction F with respect to the hub axle 3, but which do not allow rotation in the direction opposite to the rotational direction F. Operating mechanism 40 further includes an operating tube 45, a clutch switching body 48 that is slidably supported in the hub axis direction by a support 47 that is provided in the vicinity of the cone 6 such that relative rotation with the hub axle 3 is impossible, a first return spring 49 (coil spring) that energizes this clutch switching body 48 to slide, a switching body operating piece 50 that is integrally rotatably attached to the operating tube 45 such that it slides the clutch switching body 48, and a second return spring 51 (coil spring) that energizes the operating tube 45 to rotate.

Figure 3:
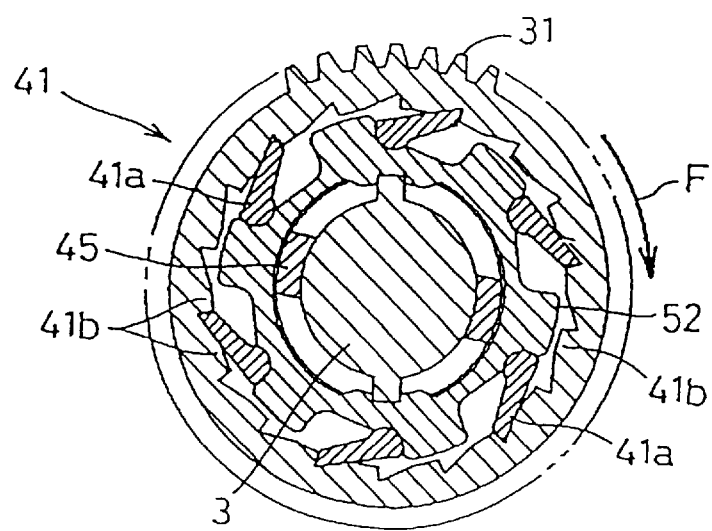
FIG. 3 is a cross sectional view of a particular embodiment of a first sun clutch according to the present invention.

The first sun clutch 41 is structured as shown in FIG. 3. More specifically, first sun clutch 41 is made up of ratchet pawls 41a that are attached such that they can swing up or down at a plurality of places in the peripheral direction on the outer peripheral side of a ring-shaped pawl support member 52 (shown in FIG. 4) that is fitted to the outside of the hub axle 3, and ratchet teeth 41b that are formed on the inner peripheral side of the first sun gear 31 so that they engage and disengage these ratchet pawls 41a. The pawl support member 52 is fastened to the anti-rotation protrusion on the hub axle 3 by an engagement member 52a provided on the inner peripheral side. Engagement member 52a links pawl support member 52 to the hub axle 3 such that relative rotation is impossible. The ratchet pawls 41a are equipped with pawl springs, and these pawl springs energize the ratchet pawls 41a to stand up, thus biasing the pawl tips of the ratchet pawls 41a so that they engage with the ratchet teeth 41b. The ratchet pawls 41a and ratchet teeth 41b are structured such that they engage in a state in which it is impossible for the first sun gear 31 to rotate in the direction opposite the rotational direction F with respect to the hub axle 3.

Figure 6A:
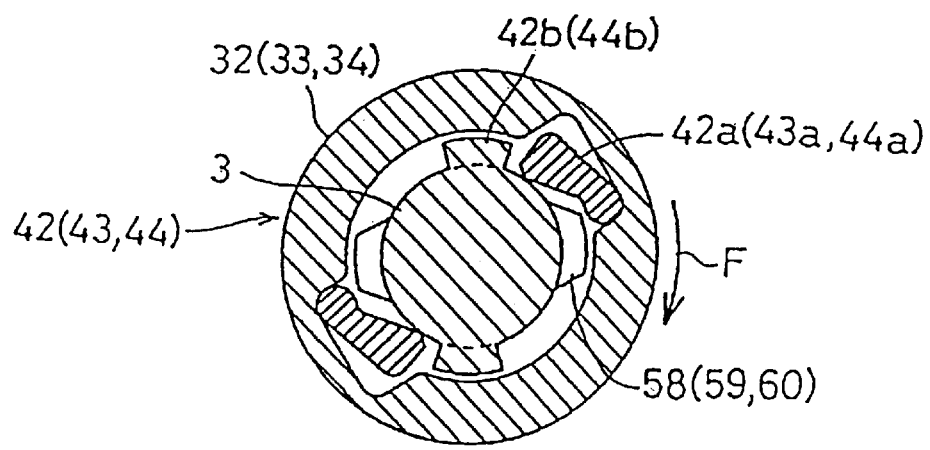
FIG. 6(*a*) is a cross sectional view of a particular embodiment of a second sun clutch according to the present invention.
Figure 6B:
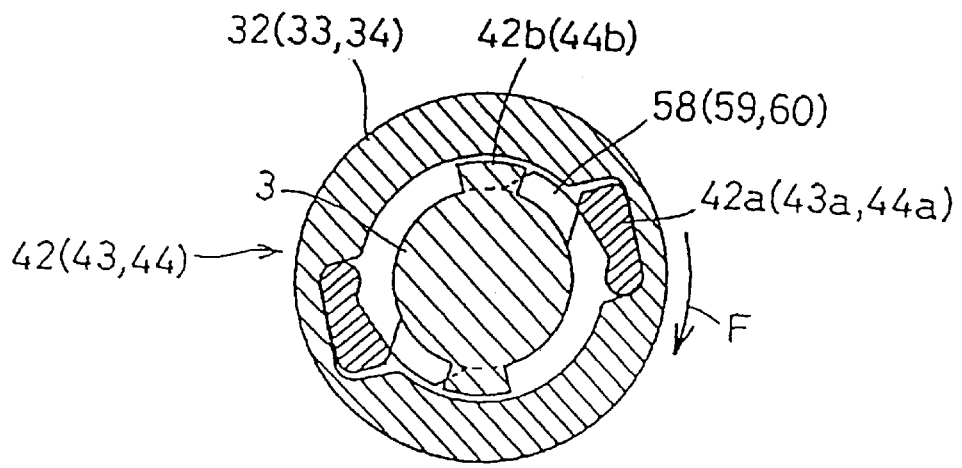

The second sun clutch 42 is structured as shown in FIG. 6. More specifically, second sun clutch 42 is made up of ratchet pawls 42a that are attached such that they can swing up or down at a plurality of places in the peripheral direction on the inner peripheral side of the second sun gear 32, and stopper protrusions 42b formed on the hub axle 3 such that they stop the pawl tips of these ratchet pawls 42a. The ratchet pawls 42a are equipped with pawl springs, and these pawl springs energize the ratchet pawls 42a to stand up, thus biasing the pawl tips of the ratchet pawls 42a so that they are stopped at the stopper protrusions 42b. The ratchet pawls 42a and stopper protrusions 42b are structured such that they engage in a state in which it is impossible for the second sun gear 32 to rotate in the direction opposite the rotational direction F with respect to the hub axle 3.

The third sun clutch 43 and the fourth sun clutch 44 are constructed similarly to the second sun clutch 42. Third sun clutch 43 and fourth sun clutch 44 include ratchet pawls 43a and 44a that are attached such that they can swing up or down on the inner peripheral side of the third sun gears 33 and 34, and stopper protrusions 42b and 44b formed on the hub axle 3. The ratchet pawls 42a and 44a are also equipped with pawl springs, and the pawl tips are energized to stand up so that they engage with the stopper protrusions 42b and 44b. The second sun clutch 42 and the third sun clutch 43 share their stopper protrusions 42b.

Figure 4:
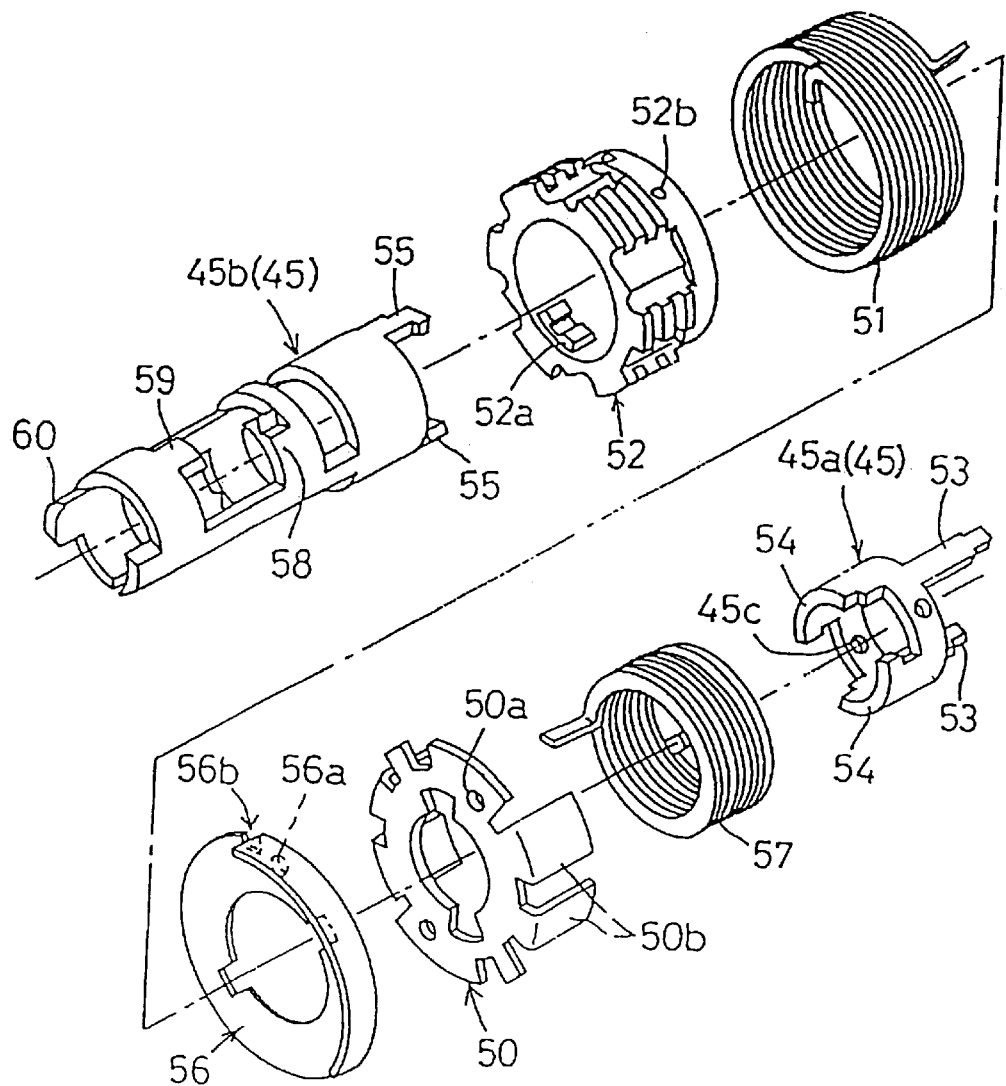
FIG. 4 is an exploded oblique view of a particular embodiment of an operating tube according to the present invention.
Figure 5:
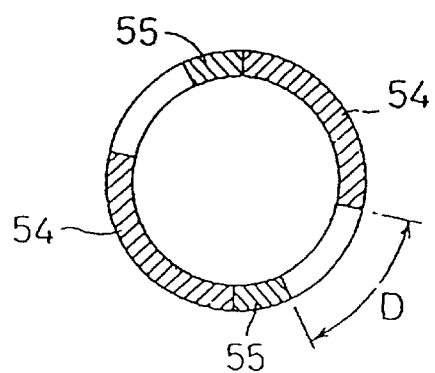
FIG. 5 is a cross sectional view showing the linkage between a first operating tube portion and a second operating tube portion.

As shown in FIG. 4, the operating tube 45 is made up of a first operating tube portion 45a that has a pair of cable holder linking arms 53 on one end and has a pair of tube portion linking tabs 54 on the other end, and a second operating tube portion 45b that has a pair of tube portion linking tabs 55 on one end. The first operating tube portion 45a rotatably fits over the hub axle 3 in a state in which its cable holder linking arms 53 rotatably enter the gap between the cone 6 and the hub axle 3, which comprises a notch on the inner peripheral side of the cone 6, and the gap between the support 47 and the hub axle 3, which comprises a notch on the inner peripheral side of the support 47. The distal end sides of the cable holder linking arms 53 protrude laterally and outwardly from the cone 6, and they are integrally rotatably linked with the cable holder 46. The second operating tube portion 45b rotatably fits over the hub axle 3 in a state in which its tube portion linking tabs 55 rotatably enter the gap between the hub axle 3 and the peripheral surface of the pawl support member 52, and enter the gap between the tube portion linking tabs 54 of the second operating tube portion 45a. As shown in FIG. 5, a flexibility D that allows both of the operating tube portions 45a and 45b to rotate relative to each other by a set rotation angle is provided between the tube portion linking tabs 54 of the first operating tube portion 45a and the tube portion linking tabs 55 of the second operating tube portion 45b.

As shown in FIG. 4, a spring holder 56 and the switching body operating piece 50 are engaged on their inner peripheral sides with the tube portion linking tabs 55 of the second operating tube portion 45b. This engagement allows the spring holder 56, the switching body operating piece 50, and the second operating tube portion 45b to rotate integrally. One end of a kinetic spring 57 (coil spring) is attached to the spring attachment holes 56a and 50a of the spring holder 56 and the switching body operating piece 50, and the other end of this kinetic spring 57 is attached to the spring attachment hole 45c of the first operating tube portion 45a. As a result, when the first operating tube portion 45a is rotationally operated by the shift cable 7, if the switching resistance of the first power transmission clutch 35 and the second through fourth sun clutches 42 through 44 is low, then the rotational power of the first operating tube portion 45a will be transmitted to the second operating tube portion 45b without the kinetic spring 57 being elastically deformed, and the second operating tube portion 45b will rotate simultaneously with the first operating tube portion 45a. If the switching resistance of the first power transmission clutch 35 and the second through fourth sun clutches 42 through 44 is high, then the kinetic spring 57 will be elastically deformed, the operating force that is used to rotationally operate the second operating tube portion 45b will accumulate, and the second operating tube portion 45b will be rotated by the accumulated operating force of the kinetic spring 57 at the point when the front gear reaches top dead center or bottom dead center and the switching resistance of the first power transmission clutch 35 and the second through fourth sun clutches 42 through 44 is reduced. As a result, the operating tube 45 can be rotationally operated over its entirety by pulling or relaxing the shift cable 7 to rotationally operate the first operating tube portion 45a.

One end of the second return spring 51 enters an attachment hole 52b (shown in FIG. 4) of the pawl support member 52 to fasten the second return spring 51 to the pawl support member 52, and the other end enters an attachment notch 56b (shown in FIG. 6) of the spring holder 56 to fasten the second return spring 51 to the spring holder 56. The second return spring 51 is twisted and elastically deformed when the operating tube 45 is rotationally operated by the pulling force of the shift cable 7, and returns the operating tube 45 in the rotational direction opposite the rotational direction in which the shift cable 7 pulls.

Figure 7:
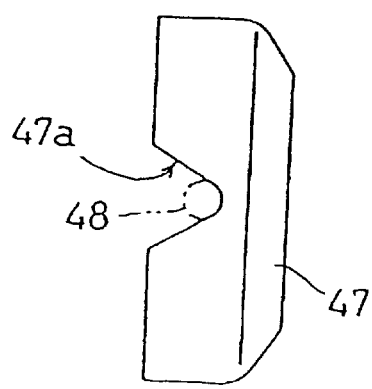
FIG. 7 is a side view showing how an operating pin of a clutch switch shown in FIG. 1 fits within a recessed portion of a support member.

The clutch switching body 48 is equipped with an operating pin 48a that protrudes from the inner peripheral side thereof. This operating pin 48a slidably enters between the sides of a notch (shown in FIG. 7) provided to the outer peripheral side of the support 47 and a pair of operating arms 50b (shown in FIG. 4) provided to the switching body operating piece 50. When the second operating tube portion 45b is rotated by the rotational operation of the first operating tube portion 45a, the switching body operating piece 50 rotates along with the second operating tube portion 45b, and the operating arms 50b either push the operating pin 48a against an inclined guide component 47a (shown in FIG. 7) of the support 47, or release this pushing. When the operating pin 48a is pushed against the inclined guide component 47a, the clutch switching body 48 moves toward the first power transmission clutch 35 against the first return spring 49 along the inclined guide component 47a and the operating arms 50b because of the cam action produced by the inclined guide component 47a. Clutch switching body 48 then hits the free end side of the ratchet pawls 35a of the clutch 35, pushes the ratchet pawls 35a away from the ratchet teeth 35b, and disengages the first power transmission clutch 35. When the pushing of the operating pin 48a against the inclined guide component 47a is released, the clutch switching body 48 moves away from the first power transmission clutch 35 because of the return force exerted by the first return spring 49. The pressing of clutch 35 against the ratchet pawls 35a is released, the ratchet pawls 35a are engaged with the ratchet teeth 35b by the pawl springs, and the first power transmission clutch 35 is engaged.

As shown in FIG. 4, the second operating tube portion 45b is equipped with a second control component 58 for the second sun clutch 42, a third control component 59 for the third sun clutch 43, and a fourth control component 60 for the fourth sun clutch 44. The second control component 58 is switched by the rotation of the second operating tube portion 45b between the clutch disengagement position shown in FIG. 6b and the clutch engagement position shown in FIG. 6a. When in the clutch disengagement position, if the second control component 58 attempts to rotate in the direction opposite the rotational direction F with respect to the hub axle 3 because of the operating force exerted by the second planet gear 22 rotated by the second sun gear 32, the ratchet pawls 42a slide over the inclined surfaces of stopper protrusions 42b. As a result, the second sun gear 32 is able to rotate in the direction opposite the rotational direction F with respect to the hub axle 3. More specifically, the second sun clutch 42 is disengaged, and the second sun gear 32 is made able to rotate in the direction opposite the rotational direction F with respect to the hub axle 3. When in the clutch engagement position, however, if the second control component 58 attempts to rotate in the direction opposite the rotational direction F with respect to the hub axle 3 because of the operating force exerted by the second planet gear 22 rotated by the second sun gear 32, the ratchet pawls 42a are stopped by the stopper protrusions 42b. As a result, the second sun gear 32 is unable to rotate in the direction opposite the rotational direction F. In other words, the second sun clutch 42 is engaged, and the second sun gear 32 is made unable to rotate in the direction opposite the rotational direction F with respect to the hub axle 3.

The third control component 59 and the fourth control component 60, just as with the second control component 58, are also switched by the rotation of the second operating tube portion 45b between the clutch disengagement position and the clutch engagement position. The sun clutches 43 and 44 are disengaged to allow the sun gears 33 and 34 to rotate in the direction opposite the rotational direction F with respect to the hub axle 3, and the sun clutches 43 and 44 are engaged to prevent the sun gears 33 and 34 to rotate in the direction opposite the rotational direction F with respect to the hub axle 3.

In this embodiment, the operating tube 45 is not equipped with a control component for the first sun clutch 41. However, when the second sun clutch 42 is engaged and the first ring gear 29 is rotated in the rotational direction F to rotate the second planet gear 22 in the rotational direction F, the first planet gear 21 autorotates along with the second planet gear 22, but because the outside diameter of the first planet gear 21 is smaller than the outside diameter of the second planet gear 22, and because the first sun clutch 41 is a one-way clutch as mentioned above, the first sun gear 31 rotates freely in the rotational direction F along with the first planet gear 21. When the second sun clutch 42 is then disengaged and the first ring gear 29 is rotated in the rotational direction F to autorotate the first planet gear 21, an operating force that causes rotation in the direction opposite the rotational direction F acts on the first sun gear 31, but the first sun gear 31 does not rotate in the direction opposite the rotational direction F because of the stopper action provided by the ratchet pawls 41a of the first sun clutch 41.

In summary, when the operating tube 45 is rotationally operated, the operating mechanism 40 makes use of the clutch switching body 48 to control the switching of the first power transmission clutch 35 and to control the engagement and disengagement of power transmission from the driver 10 to the first carrier 26. Furthermore, the operating mechanism 40 controls the switching of the second through fourth sun clutches 42, 43, and 44 by means of the second operating tube portion 45b, which switches the second through fourth sun gears 32, 33, and 34 between a state in which they are able to rotate in the direction opposite the rotational direction F with respect to the hub axle 3 and a state in which they are unable to rotate in the direction opposite the rotational direction F. The first sun gear 31 is switched between a state in which it is unable to rotate in the direction opposite the rotational direction F with respect to the hub axle 3 and a state in which it is able to rotate in the direction opposite the rotational direction F by means of control of the second sun clutch 42 and the one-way clutch action of the first sun clutch 41.

When the operating tube 45 rotates and switches between the various operating positions of the first through seventh speeds, the setting of the arrangement relationship of the operating arms 50b and the second through fourth control components 58, 59, and 60 in the operating tube peripheral direction causes the first power transmission clutch 35 and the first through fourth sun clutches 41, 42, 43, and 44 to be in a state of engagement, disengagement, or non-actuation, as shown in FIG. 10. In FIG. 10, "-" indicates a state in which the one-way clutches 35 through 37 and 41 through 44 are not actuated and the relative rotation thereof is permitted. This state is called a "state of non-actuation." "○" indicates a state in which the one-way clutches are actuated and the relative rotation thereof is blocked. This state is called "engagement." "×" indicates a state in which the engagement of the one-way clutches is forcibly blocked and the relative rotation thereof is permitted. This state is called "disengagement." If a clutch has no "×," it means that there is no need for control.

When the shift cable 7 is pulled or relaxed, the operating tube 45 is rotated by the tension of the shift cable 7 or by the elastic return force of the second return spring 51, and is switched between seven operating positions (first through seventh speeds). When the operating tube 45 reaches the first speed position, the first power transmission clutch 35 and the second, third, and fourth sun clutches 42, 43, and 44 are disengaged, the second power transmission clutch 36 is in a non-actuated state, the third power transmission clutch 37 and the first sun clutch 41 are engaged, and the shifter 20 is in first speed. The rotational power of the driver 10 is transmitted to the hub body 2 via the first ring gear 29, the first planet gear 21, the first carrier 26, the second carrier 28, and the third power transmission clutch 37.

When the operating tube 45 reaches the second speed position, the first power transmission clutch 35 and the third and fourth sun clutches 43 and 44 are disengaged, the second power transmission clutch 36 and the first sun clutch 41 are in a non-actuated state, the third power transmission clutch 37 and the second sun clutch 42 are engaged, and the shifter 20 is in second speed. The rotational power of the driver 10 is transmitted to the hub body 2 via the first ring gear 29, the second planet gear 22, the first carrier 26, the second carrier 28, and the third power transmission clutch 37.

When the operating tube 45 reaches the third speed position, the first power transmission clutch 35 and the second and third sun clutches 42 and 43 are disengaged, the second power transmission clutch 36 and the first and fourth sun clutches 41 and 44 are engaged, the third power transmission clutch 37 is in a non-actuated state, and the shifter 20 is in third speed. The rotational power of the driver 10 is transmitted to the hub body 2 via the first ring gear 29, the first planet gear 21, the first carrier 26, the second carrier 28, the fourth planet gear 24, the second ring gear 30, and the second power transmission clutch 36.

When the operating tube 45 reaches the fourth speed position, the first power transmission clutch 35 and the second sun clutch 42 are disengaged, the second power transmission clutch 36 and the first and third sun clutches 41 and 43 are engaged, the third power transmission clutch 37 and the fourth sun clutch 44 are in a non-actuated state, and the shifter 20 is in fourth speed. The rotational power of the driver 10 is transmitted to the hub body 2 via the first ring gear 29, the first planet gear 21, the first carrier 26, the second carrier 28, the third planet gear 23, the second ring gear 30, and the second power transmission clutch 36.

When the operating tube 45 reaches the fifth speed position, the first power transmission clutch 35 is disengaged, the third power transmission clutch 37 and the first and fourth sun clutches 41 and 44 are in a non-actuated state, the second power transmission clutch 36 and the second and third sun clutches 42 and 43 are engaged, and the shifter 20 is in fifth speed. The rotational power of the driver 10 is transmitted to the hub body 2 via the first ring gear 29, the second planet gear 22, the first carrier 26, the second carrier 28, the third planet gear 23, the second ring gear 30, and the second power transmission clutch 36.

When the operating tube 45 reaches the sixth speed position, the first power transmission clutch 35, the second power transmission clutch 36, and the fourth sun clutch 44 are engaged, the third power transmission clutch 37 and the first and second sun clutches 41 and 42 are in a non-actuated state, the third sun clutch 43 is disengaged, and the shifter 20 is in sixth speed. The rotational power of the driver 10 is transmitted to the hub body 2 via the first power transmission clutch 35, the first carrier 26, the second carrier 28, the fourth planet gear 24, the second ring gear 30, and the second power transmission clutch 36.

When the operating tube 45 reaches the seventh speed position, the first power transmission clutch 35, the second power transmission clutch 36, and the third sun clutch 43 are engaged, the third power transmission clutch 37 and the first, second, and fourth sun clutches 41, 42, and 44 are in a non-actuated state, and the shifter 20 is in seventh speed. The rotational power of the driver 10 is transmitted to the hub body 2 via the first power transmission clutch 35, the first carrier 26, the second carrier 28, the third planet gear 23, the second ring gear 30, and the second power transmission clutch 36.

When the driver 10 is rotationally operated in the direction opposite the rotational direction F, no matter which of the first through seventh speeds the shifter 20 is in, all of the sun gears 31 through 34 will rotate freely in the rotational direction F with respect to the hub axle 3 and the driver 10 will run idle because all of the first through fourth sun clutches 41, 42, 43, and 44 are one-way clutches as mentioned above. Also, when the bicycle is backed up and the wheels rotated backward, the rotation in the direction opposite the rotational direction F of the hub body 2 is transmitted from the second carrier 28 to the first carrier 26, and the first carrier 26 rotates in the direction opposite the rotational direction F with respect to the hub axle 3. Consequently, the ratchet pawls 41a or 42a of either the first sun clutch 41 or the second sun clutch 42 rise up, and the first ring gear 29 increases speed and is rotationally operated in the direction opposite the rotational direction F. At this point, even if the first power transmission clutch 35 is engaged, because it is a one-way clutch as mentioned above, the driver 10 pushes the ratchet pawls 35a away from the ratchet teeth 35b and causes them to oscillate while it rotates relative to the first carrier 26. Therefore, no locking occurs even if the driver 10 is rotationally operated in the direction opposite the forward direction (the rotational direction F) and the bicycle is backed up.

Figure 8:
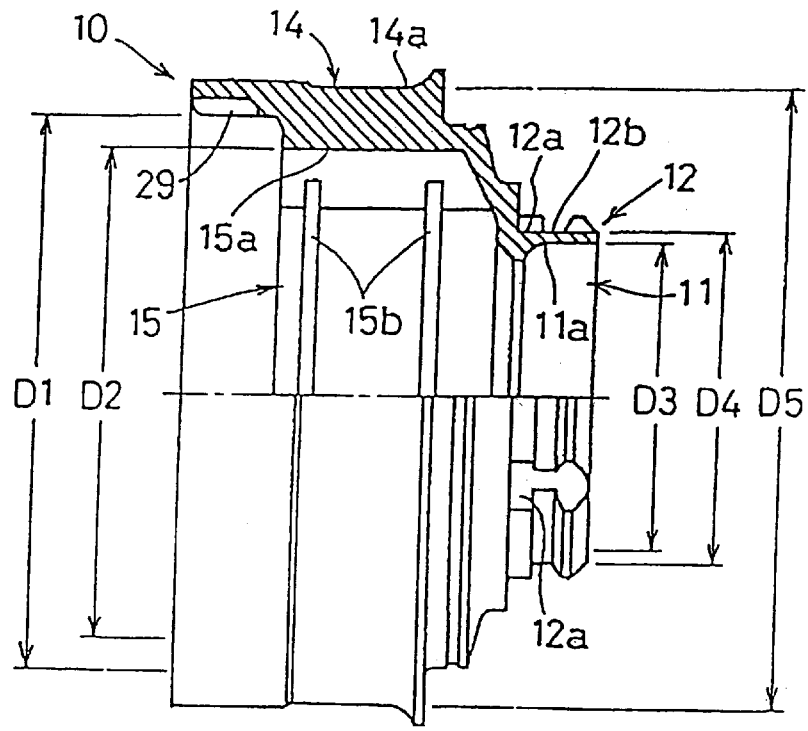
FIG. 8 is a partial cross sectional view of a particular embodiment of a drive member according to the present invention.
Figure 9:
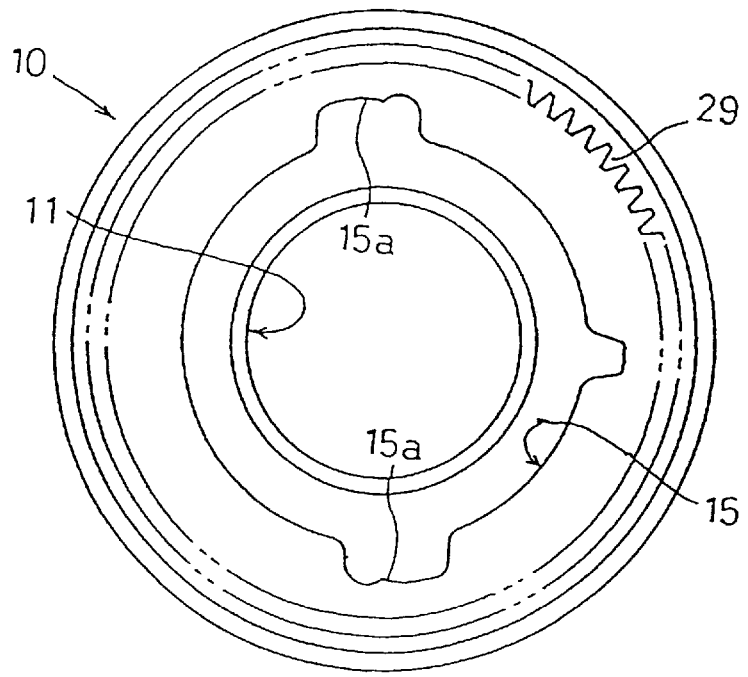
FIG. 9 is a side view of the drive member shown in FIG. 8.

As shown in FIG. 8, the driver 10 is formed in a cylindrical shape that comprises a small diameter cylinder component and a large diameter cylinder component that is linked at one end to this small diameter cylinder component and is equipped with the first ring gear 29 on the opposite end from the small diameter cylinder component, with these cylinder components being concentric. The inner peripheral side of the small diameter cylinder component is equipped with an attachment hole 11 having a ball receiving surface 11a used for attachment to the hub axle 3. The outer peripheral side of the small diameter cylinder component is equipped with a chain sprocket attachment component 12 having a depression 12a into which goes an anti-rotation protrusion on the inner peripheral side of the chain sprocket 1, and having an annular groove 12b into which goes a sprocket fixing ring 13. The outer peripheral side of the large diameter cylinder component, between the first ring gear 29 and the 11 attachment hole, is equipped with a depression 15a (shown in FIG. 9) into which rotatably goes the base end of the ratchet pawl 35a, and an annular groove 15b into which goes a pawl spring. This structure makes it possible to rotatably attach the driver 10 to the hub axle 3, to integrally rotatably support the chain sprocket 1 on the driver 10, to rotatably attach the hub body 2 to the hub axle 3 via the driver 10, and to install the first power transmission clutch 35 on the driver 10.

The inside diameter D1 of the ring gear 29 is larger than the inside diameter D2 of the clutch assembly hole 15, and the inside diameter D2 of the clutch assembly hole 15 is larger than the inside diameter D3 of the attachment hole 11. This makes it possible to easily insert the ratchet pawls 35a into the clutch assembly hole 15 from the first ring gear 29, and to attach the shifter 20 or the operating mechanism 40 to the hub axle 3 and insert them into the driver 10 along with the hub axle 3 from the first ring gear 29. The outside diameter D4 of the chain sprocket attachment component 12 is smaller than the outside diameter D5 of the hub body support component 14, which makes it possible to employ a small diameter sprocket as the chain sprocket 1.

The brake 70 is equipped with a brake case 72 that is attached to the hub axle 3, a brake shoe 73 that is positioned on the inner side of the brake drum 71, a roller 74 that is positioned on the inner peripheral side of this brake shoe 73 and is structured such that it is supported by the brake case 72 via a roller case (not shown), and an operating cam 75 that is fitted on the outside of the cone 9 and is structured such that it is rotatably supported by the brake case 72. The brake drum 71 is linked by a spline component 71a to the side wall component 2d of the hub body 2 such that it can be removed and can rotate integrally. The operating cam 75 is rotationally operated by being linked to a brake cable, and when it is rotationally operated to the braking position, the roller 74 is pushed out from the roller case toward the brake shoe 73, and the brake shoe 73 is pushed via the roller 74 against the inner peripheral surface of the brake drum 71. This results in the brake 70 applying frictional braking to the wheel via the brake drum 73.

While the above is a description of various embodiments of the present invention, further modifications may be employed without departing from the spirit and scope of the present invention. For example, the present invention can also be applied to cases in which one or more of the second through fourth planet gears 22, 23, and 24 is omitted, or in which a shifter internal hub of other than seven speeds is configured, e.g., the number of speeds is less than seven.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A drive member for an internally mounted bicycle transmission comprising an annular member (10) having a first end (12) structured for attaching a sprocket (1) thereto and a second end (14) having a plurality of teeth disposed along a peripheral surface thereof for forming a ring gear (29), wherein the ring gear (29) defines a ring gear hole having a first diameter (D1), wherein the second end (14) defines a clutch assembly hole (15) having a second diameter (D2); and a power transmission clutch (35) disposed in the clutch assembly hole (15), wherein the power transmission clutch (35) moves radially toward and away from an inner peripheral surface of the clutch assembly hole (15), wherein the first end (12) of the annular member (10) defines an attachment hole (11) having a third diameter (D3) for receiving a hub axle (3) therethrough, wherein the clutch assembly hole (15) is disposed axially between the ring gear hole and the attachment hole (11); a first side wall of the annular member (10) extending radially inwardly from an inner peripheral surface of the annular member (10) and defining a junction between the ring gear hole and the clutch assembly hole (15); and a second side wall of annular member (10) extending radially inwardly from the inner peripheral surface of the annular member (10) and defining a junction between the clutch assembly hole (15) and the attachment hole (11).

2. The drive member according to claim 1 wherein the plurality of teeth are disposed along an inner peripheral surface of the second end (14) of the annular member (10).

3. The drive member according to claim 1 wherein the first end (12) of the annular member (10) defines a depression (12a) on an outer peripheral surface thereof for nonrotatably attaching the sprocket (1) thereto.

4. The drive member according to claim 1 wherein the first diameter (D1) is greater than the second diameter (D2) and the second diameter (D2) is greater than the third diameter (D3).

5. The drive member according to claim 1 wherein the annular member is one piece.

6. The drive member according to claim 1 wherein the power transmission clutch (35) includes a pawl (35a) pivotably mounted to the inner peripheral surface of the clutch assembly hole (15).

7. An internally mounted bicycle transmission comprising:
   a hub axle (3);
   a drive member (10) rotatably mounted around the hub axle (3);
   a hub body (2) rotatably mounted around the hub axle (3);
   a gear mechanism (21,22,23,24,26,28,29,30,31,32,33,34) coupled between the drive member (10) and the hub body (2) for communicating rotational force from the drive member (10) to the hub body (2) through multiple transmission paths, wherein the gear mechanism includes:
      a sun gear (31) rotatably supported around the axle (3);
      a planet gear (21) supported by a planet gear carrier (26) for rotation around the hub axle (3), wherein the planet gear (21) engages the sun gear (31); and
      a ring gear (29) engaging the planet gear (21), wherein the ring gear (29) is integrally formed with the drive member (10);
   wherein the drive member (10) comprises an annular member (10) having a first end (12) structured for attaching a sprocket (1) thereto and a second end (14) having a plurality of teeth disposed along a peripheral surface thereof for forming the ring gear (29), wherein the ring gear (29) defines a ring gear hole having a first diameter (D1), wherein the second end (14) defines a clutch assembly hole (15) having a second diameter (D2); and a power transmission clutch (35) disposed in the clutch assembly hole (15) for selectively nonrotatably coupling the drive member (10) to the planet gear carrier (26), wherein the first end (12) of the annular member (10) defines an attachment hole (11) having a third diameter (D3) for receiving a hub axle (3) therethrough, and wherein the clutch assembly hole (15) is disposed axially between the ring gear hole and the attachment hole (11).

8. The transmission according to claim 7 wherein the plurality of teeth are disposed along an inner peripheral surface of the second end (14) of the annular member (10).

9. The transmission according to claim 7 wherein an outer peripheral surface (12a) of the first end (12) of the annular member (10) defines a sprocket attachment component (12) and is structured for nonrotatably attaching the sprocket (1) thereto.

10. The transmission according to claim 7 wherein the first diameter (D1) is greater than the second diameter (D2) and the second diameter (D2) is greater than the third diameter (D3).

11. The transmission according to claim 7 wherein the power transmission clutch (35) is disposed between the drive member (10) and the planet gear carrier (26).

12. The transmission according to claim 11 wherein the first diameter (D1) is greater than the second diameter (D2) and the second diameter (D2) is greater than the third diameter (D3).

13. The transmission according to claim 12 wherein an outer peripheral surface (12a) of the first end (12) of the annular member (10) defines a sprocket attachment component (12) and is structured for nonrotatably attaching the sprocket (1) thereto.

14. The transmission according to claim 13 wherein a diameter (D4) of the sprocket attachment component (12) is smaller than a diameter (D5) of the second end (14) of the annular member (10).

15. The transmission according to claim 12 wherein the hub body (2) is rotatably supported on the second end (14) of the annular member (10).

16. The transmission according to claim 7 wherein the ring gear (29) is formed as one piece with the drive member (10).

17. The transmission according to claim 7 wherein the annular member is one piece.

18. The transmission according to claim 7 wherein the annular member (10) includes:
- a first side wall extending radially inwardly from an inner peripheral surface of the annular member (10) and defining a junction between the ring gear hole and the clutch assembly hole (15); and
- a second side wall extending radially inwardly from the inner peripheral surface of the annular member (10) and defining a junction between the clutch assembly hole (15) and the attachment hole (11).

* * * * *